United States Patent [19]
Norberg

[11] 3,935,934
[45] Feb. 3, 1976

[54] RELEASABLE AXIAL CLUTCH
[75] Inventor: Lars Norberg, Finspong, Sweden
[73] Assignee: Stal-Laval Turbin AB, Norrkoping, Sweden
[22] Filed: July 1, 1974
[21] Appl. No.: 484,595

[30] Foreign Application Priority Data
July 5, 1973 Sweden.............................. 7394591

[52] U.S. Cl................ 192/46; 192/67 R; 192/67 A
[51] Int. Cl.².................. F16D 41/00; F16D 11/00; F16D 23/02
[58] Field of Search........ 192/53 B, 46, 67 R, 67 A; 64/23, 9 R, 30 A

[56] References Cited
UNITED STATES PATENTS

| 776,404 | 11/1904 | Keyser............................. 192/53 B |
| 1,368,888 | 2/1921 | Brown.............................. 192/53 B |
| 2,807,343 | 9/1957 | Ryder et al........................ 192/53 B |
| 2,986,021 | 5/1961 | Mottu et al......................... 64/23 X |
| 3,534,843 | 10/1970 | Sinclair et al..................... 192/67 A |

Primary Examiner—Allan D. Herrmann
Attorney, Agent, or Firm—Eric Y. Munson

[57] ABSTRACT

A releasable, self-locking axial clutch for firmly coupling two shafts having axially relatively movable end portions secured to their respective ends and an axially displaceable clutch piece between the end portions for transmitting a torque therebetween includes mating conical surfaces on the respective end portions and thus automatically provides mutual centering, parallelism and good fit of the end portions when drawn tightly together.

4 Claims, 4 Drawing Figures

RELEASABLE AXIAL CLUTCH

BACKGROUND OF THE INVENTION

The present invention relates to a releasable axial clutch for coupling together two shafts, preferably for large machines. The clutch comprises two parts, one from each shaft end, which parts are axially movable in relation to each other, and between the two parts there is an axially displaceable part for transmitting a torque between said two parts.

In axial clutches of this type the axially displaceable portion in the centre is normally provided with external gears which are in constant, displaceable mesh with internal gears in one clutch part and other external gears which, upon a displacement are brought to mesh with internal gears in the other clutch part. Further the clutch is designed so that the two parts of the clutch when being coupled together, are pressed tightly together, thus forming a firm, rigid unit.

The purpose of drawing the two clutch parts tightly together is to avoid any tendency to vibrations which would quickly destroy the clutch in the case of large machines, for example turbines and generators.

SUMMARY OF THE INVENTION

When the clutch parts are to be pressed tightly together it is important that the mutual centering of the two clutch parts should be correct, which may cause problems despite a good fit between the different parts. The object of the invention it to secure this mutual centering, which is performed by means of conical surfaces on the two clutch parts which then themselves try to find the correct centered position.

BRIEF DESCRIPTION OF THE DRAWINGS

The clutch is described more closely with reference to the accompanying drawings in which FIGS. 1 and 2 show a clutch according to the invention in disconnected and connected positions, respectively, whereas

DETAILED DESCRIPTION OF THE PREFERRED EMBODIMENTS

Figure 1:
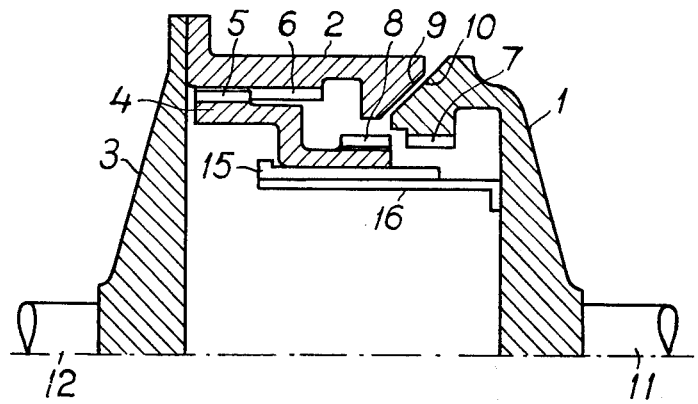
Figure 2:
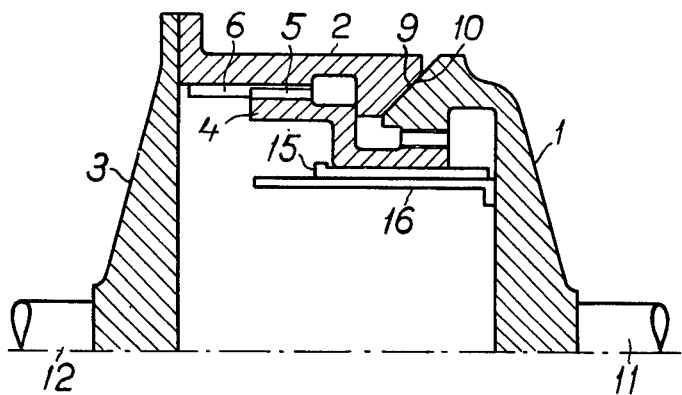

FIGS. 1 and 2 show the two shaft ends 11 and 12, each provided with a flange 1 and 3, respectively. At the outer edge the flange 1 ends in an annular part with internal gears 7. At the outer edge of flange 3 a cylindrical part 2 with internal gears 6 is bolted on. Between the two clutch parts 1 and 3 there is a clutch piece 4 which is provided with external gears 5 and 8 at the ends corresponding to the internal ones 6 and 7, respectively, on the two clutch parts 1 and 2.

The teeth 6 and 5 are in permanent displaceable engagement by the fact that the teeth 6 have such a length that the piece 4 can be moved along these. Engagement between the two clutch parts is performed by the fact that the gears 7 and 8 engage with each other when the piece 4 is moved to the right. The guiding of the piece 4 is performed, for example, by means of bushings 15 and 16 on the piece 4 and the flange 1, respectively.

The shifting of the clutch piece 4 can be carried out in a manner not shown, for example hydraulically, pneumatically or electromagnetically. Often this form of movement is only intended to be a first shifting until the gears 7 and 8 start engaging with each other. If, thereafter, the teeth are assumed to be helical with a greater pitch of the tooth pair 5, 6 than of the tooth pair 7, 8 and with such a bevelling that the torque between the clutch parts causes the parts to be screwed together, the clutch will be self-locking and the parts 1 and 2 are tightly pressed together. It is clear that it is sufficient for the tooth pair 7, 8 to be helical whereas the tooth pair 5, 6 may have straight teeth.

To secure the mutual centering of the two clutch parts, the flange 1 and the cylinder 2 have been provided with an outwardly and inwardly conical surface 10 and 9, respectively. In such a way the two clutch parts will automatically center in relation to each other, irrespective of the occurrence of any clearance between the clutch piece 4 and the other parts. If the conical surfaces 9 and 10 are made to be sufficiently obtuse, also a certain compensation for possible angular errors between the two parts can be obtained. The choice of the top angle for the conical surfaces will then be a compromise between the requirements for a good centering and good parallelism between the parts, and it must then be borne in mind that we are all the time concerned with attempts to compensate the small errors which are unavoidable in spite of good precision in the manufacture and which may involve severe wear considering the forces which will occur in large machines and with large dimensions.

Figure 3:
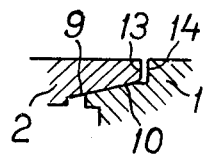
FIGS. 3 and 4 show a few variants of the embodiment of the conical surfaces of the clutch parts. All figures show one half of an axial section through the clutch or a part thereof.
Figure 4:
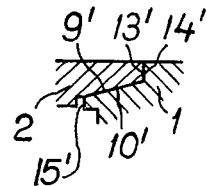

The demands for simultaneous centering and parallelism can be satisfied by using the variants shown in FIGS. 3 and 4, where the conical surfaces 9 and 10 are bordered by plane annular surfaces 13, 14 or 13', 14', facing each other.

It should be considered that in spite of close tolerances of manufacture it is normally not possible to achieve a simultaneous perfect contact between both the conical and the plane surfaces, and therefore it should be determined in advance which surfaces are to lie close to each other and which are to have a small clearance between them.

FIG. 3 shows, somewhat exaggeratedly, a play between the plane surfaces 13, 14, whereas the conical surfaces 9, 10 make close contact with each other. In this way the best possible centering is achieved, whereas the maximum angular error is determined by the play between the surfaces 13 and 14 and the outer diameter by these surfaces. By choosing this diameter to be great and the play as small as possible for reasons of tolerance the angular error can be limited.

In FIG. 4 the plane surfaces 13', 14' are in close contact with each other, whereas the conical surfaces 9', 10' show some small clearance 15'. In this way angular errors are avoided, but a radial error limited by the clearance between the conical surfaces and their diameters can arise. In this case the diameter of the surfaces 9', 10', 13', 14' should be chosen small.

I claim:
1. A releasable, self-locking axial clutch for firmly coupling together two shafts comprising:
   two clutch portions each of which is secured to one shaft end and axially movable in relation to each other for pressing tightly together,
   an axially displaceable clutch piece means provided between the two clutch portions for transmitting a torque therebetween,
   the clutch piece means being in constant rotational engagement with one of the clutch portions and axially slidable in relation thereto, the clutch piece means and the other of the clutch portions being provided with helical teeth means for selflocking engagement in dependence on the torque between the clutch portions resulting in drawing the portions together, and the clutch portions being provided with complementary outwardly and inwardly conical surfaces, respectively, for mutual centering of the clutch portions when they are drawn tightly together.

2. A releasable, self-locking axial clutch according to claim 1 wherein the conical surfaces on the two clutch portions are each bordered by a plane surface perpendicular to the axial direction of the coupling with the two plane surfaces facing each other.

3. A releasable, self-locking clutch according to claim 2, wherein the two conical surfaces are arranged with such a mutual diametrical relation that, when the two clutch portions make perfect contact with each other, the two conical surfaces bear against each other whereas the two plane surfaces have a certain small clearance between them.

4. A releasable, self-locking axial clutch according to claim 2, wherein the two conical surfaces are arranged with such a mutual relation that, when the two clutch portions make perfect contact with each other, the two plane surfaces bear against each other whereas the two conical surfaces have a certain small clearance between them.

* * * * *